United States Patent [19]
Baek et al.

[11] Patent Number: 5,754,218
[45] Date of Patent: May 19, 1998

[54] VARIABLE DOT DENSITY PRINTING SYSTEM USING SUB-MICRODOT MATRIXING AND A ZOOM LENS

[75] Inventors: Seung Ho Baek, Pittsford; Thomas Andrew Mackin, Hamlin; Donald DeJager, Rochester, all of N.Y.

[73] Assignee: Eastman Kodak Company, Rochester, N.Y.

[21] Appl. No.: 892,884

[22] Filed: Jun. 3, 1992

[51] Int. Cl.$^6$ .................. B41J 2/47; H04N 1/23
[52] U.S. Cl. .................. 347/240; 347/237; 358/298
[58] Field of Search ............... 346/107 R, 108, 346/160, 1.1, 154; 358/298, 459; 347/237, 240, 131, 132, 247, 251

[56] References Cited

U.S. PATENT DOCUMENTS

| | | | |
|---|---|---|---|
| 3,988,742 | 10/1976 | Meier et al. | 347/237 |
| 4,115,816 | 9/1978 | Moe et al. | |
| 4,189,752 | 2/1980 | Moe et al. | |
| 4,296,197 | 10/1981 | Stevie | |
| 4,435,064 | 3/1984 | Tsukada et al. | 347/130 X |
| 4,542,392 | 9/1985 | Schulz-Hennig | 347/236 |
| 4,543,613 | 9/1985 | Sakamoto | |
| 4,547,814 | 10/1985 | Hirosawa | |
| 4,617,578 | 10/1986 | Nezu et al. | |
| 4,651,287 | 3/1987 | Tsao | 358/459 X |
| 4,740,844 | 4/1988 | Yoshimura | |
| 4,780,768 | 10/1988 | Tomohisa et al. | |
| 4,814,886 | 3/1989 | Kuge et al. | 358/298 X |
| 4,949,105 | 8/1990 | Prowak | 347/112 |
| 5,164,742 | 11/1992 | Baek et al. | 347/237 X |

Primary Examiner—David F. Yockey
Attorney, Agent, or Firm—Nelson Adrian Blish

[57] ABSTRACT

The present invention is directed to a laser printer including a printer controller, a printhead including a plurality of lasers formed in an array for receiving modulating image data from the printer controller, a variable magnifying means such as a zoom lens, and a drum on which a receiver member is mounted on which an image is to be printed. The printer controller is arranged to selectively use any one of a set of predetermined microdot matrixing values and a separate sub-microdot matrix associated therewith, and distribute image data to the plurality of lasers based on such microdot and sub-microdot matrixing values. The variable magnification means (e.g., a zoom lens) applies optical magnification or demagnification to light beams from the array of lasers to provide selective variable microdot matrixing values between the predetermined microdot matrixing values of the set. Therefore, any dot density between a low and a high microdot matrix value of the set of predetermined microdot matrixing values is produced using combinations of microdot and sub-microdot matrixing by the printer controller and variable magnification of the zoom lens.

18 Claims, 5 Drawing Sheets

VARIABLE DOT DENSITY PRINTING SYSTEM USING SUB-MICRODOT MATRIXING AND A ZOOM LENS

FIELD OF THE INVENTION

The present invention relates to a technique for providing variable dot densities and dot sizes in a multi-beam or multi-channel printing system.

BACKGROUND OF THE INVENTION

Halftone printing techniques are well known in the prior art and use different screen ruling ranging from, for example, 75 screen dots per inch (SDPI) to 300 SDPI depending on the image quality and application desired. The lesser screen rulings (e.g., 75 SDPI) provide the lowest image quality (resolution) with the image quality increasing as the screen ruling (SDPI) increases. A few screen rulings which are commonly used in the printing industry are 75, 120, 150, 200, 240, and 300 SDPI. A halftone scanning printer preferably has a capability of changing the screen ruling as well as the printing dot density. In such prior art halftone scanning printers, the screen rulings are changed by software associated with a Raster Image Processor (RIP), whereas the dot density is changed by changes in the printer hardware. It is to be understood that when the dot density or line density is changed, the spot size has to be changed accordingly. This change in dot or line density and spot size requires that a change in the parameters of the printing system be made. Very often changes in the parameters of the printing system hardware require cumbersome or time consuming efforts which disturbs the normal operation or productivity of the printing system.

U.S. Pat. No. 4,296,197 (R. Stevie), issued on Oct. 20, 1981, discloses a halftone printing system where halftone positive prints are made directly from gray scale photographic negatives by an enlarger apparatus. The enlarger apparatus projects an image of the gray scale negative on a sheet of high contrast positive photographic printing paper through a halftone screen. An auxiliary light source is provided, preferably inside a cone of the enlarger, in order to achieve proper dot size so as to correctly represent the different shades of gray in the resulting halftone positive print. The high contrast photographic paper is required to allegedly produce excellent halftone positive prints in which the dots are completely black throughout on a clean white background.

U.S. Pat. No. 4,617,578 (Y. Nezu et al.), issued on Oct. 14, 1986, discloses a multi-beam zoom and focusing lens scan pitch-adjusting recorder for recording reproduction picture images. In the recorder, multiple laser beams are modulated by an acoustic-optical modulator in accordance with picture signals obtained by scanning an original picture. More particularly, parallel laser beams are converted to laser beams with reduced pitches therebetween by an optical system comprising two lenses which hold a common convergent point of the laser beams. The parallel laser beams are projected through a focusing lens onto a surface of a photographic film in the vicinity of the focusing plane of the lens.

U.S. Pat. No. 4,740,844 (T. Yoshimura), issued on Apr. 26, 1988, discloses a technique which applies a magnification changing process to an image in a digital copier or the like. An image of a document is scanned by a scanner to read the image on a pixel basis, and the obtained digital video data is quantized by a space filter process with respect to multiple levels. While the scanner reads the image, operating optics of the scanner varies the instant magnification accordingly. More particularly, a zoom lens, or a pair of movable mirrors, are used in the optical path between the image and an image sensor to change the optical path and the magnification.

U.S. Pat. No. 4,780,768 (K. Tomohisa et al.), issued on Oct. 25, 1988, discloses a halftone image recording method and apparatus. The apparatus comprises memory means for storing first halftone pattern data, interpolation means, comparator means, and exposure means. The interpolation means reads the data of the first halftone pattern to produce data for a second halftone pattern by an interpolation in the main scanning direction. The comparator means sequentially compares input image signals and the second halftone pattern data on a per pixel basis. Such comparison is performed at a timing which is responsive to a rate of increase in pixel density in the main scanning direction in order to generate halftone dot recording output signals corresponding to the results of the comparison. The exposure means scans and exposes a photo-sensitive material in response to the halftone dot recording output signals from the comparison means. This creates a halftone plate in which the recording density is increased in response to a rate of increase in pixel density through the interpolation.

It is desirable to provide a printing system that covers a large variety of dot sizes and screen dot densities without requiring the cumbersome or time consuming efforts necessary to achieve a change in system parameters as found in the prior art printing systems.

SUMMARY OF THE INVENTION

The present invention is directed to a variable dot density and dot size multi-beam or multi-channel printing system. Viewed from one aspect, the present invention is directed to a laser printer for printing an image on a receiver member mounted on a rotatable drum from received image data. The printer comprises a printer controller, a printhead, and a variable magnifying means. The printer controller is responsive to the received image data for processing and distributing the image data for each line of an image to separate one of a plurality of N laser data channels based on a selected one of a predetermined set microdot matrix values and a related predetermined separate sub-microdot matrix value which is assigned to each microdot matrix value representing a predetermined image resolution on the receiver member. The printhead comprises a plurality of N lasers disposed in a predetermined array. Each laser receives image data from a separate laser data channel of the printer controller for generating light rays associated with a separate row or column of the image being printed on the receiver member. The variable magnifying means is used for demagnifying or magnifying a selected microdot matrix value to a predetermined microdot matrix value that is equal to or between the selected microdot matrix value and a next higher microdot matrix value of the predetermined set microdot matrix values. In a preferred embodiment, the variable magnifying means is a fixed conjugate focal point zoom lens.

Viewed from another aspect, the present invention is directed to a method of printing an image on a receiver member mounted on a rotatable drum of a laser printer from received image data. In a first step of the method, the received image data for each line of an image is processed and distributed to separate one of a plurality of N laser data channels based on a selected one of a predetermined set microdot matrix values and a related predetermined separate sub-microdot matrix value which is assigned to each microdot matrix value representing a predetermined image resolution on the receiver member. In a second step of the method, light rays of each of a plurality of N lasers associated with a separate row or column of the image being printed on the receiver member are modulated using processed image data from a separate one of the plurality of N laser data channels. In a third step of the method, a selected microdot matrix value is magnified or demagnified to a predetermined microdot matrix value that is equal to or between the selected microdot matrix value and a next higher microdot matrix value of the predetermined set microdot matrix values using a variable magnifying means.

The invention will be better understood from the following more detailed description taken with the accompanying drawings and claims.

The drawings are not necessarily to scale.

DETAILED DESCRIPTION

It is to be understood that corresponding elements in the several views of the drawings are provided with the same designation numbers. The present invention is directed to a variable dot density laser printer using sub-microdot matrixing and groupings to form halftone dots of a predetermined set of halftone dot densities, and a zoom lens to provide a wide range of halftone dot densities between the predetermined set of halftone dot densities.

Figure 1:
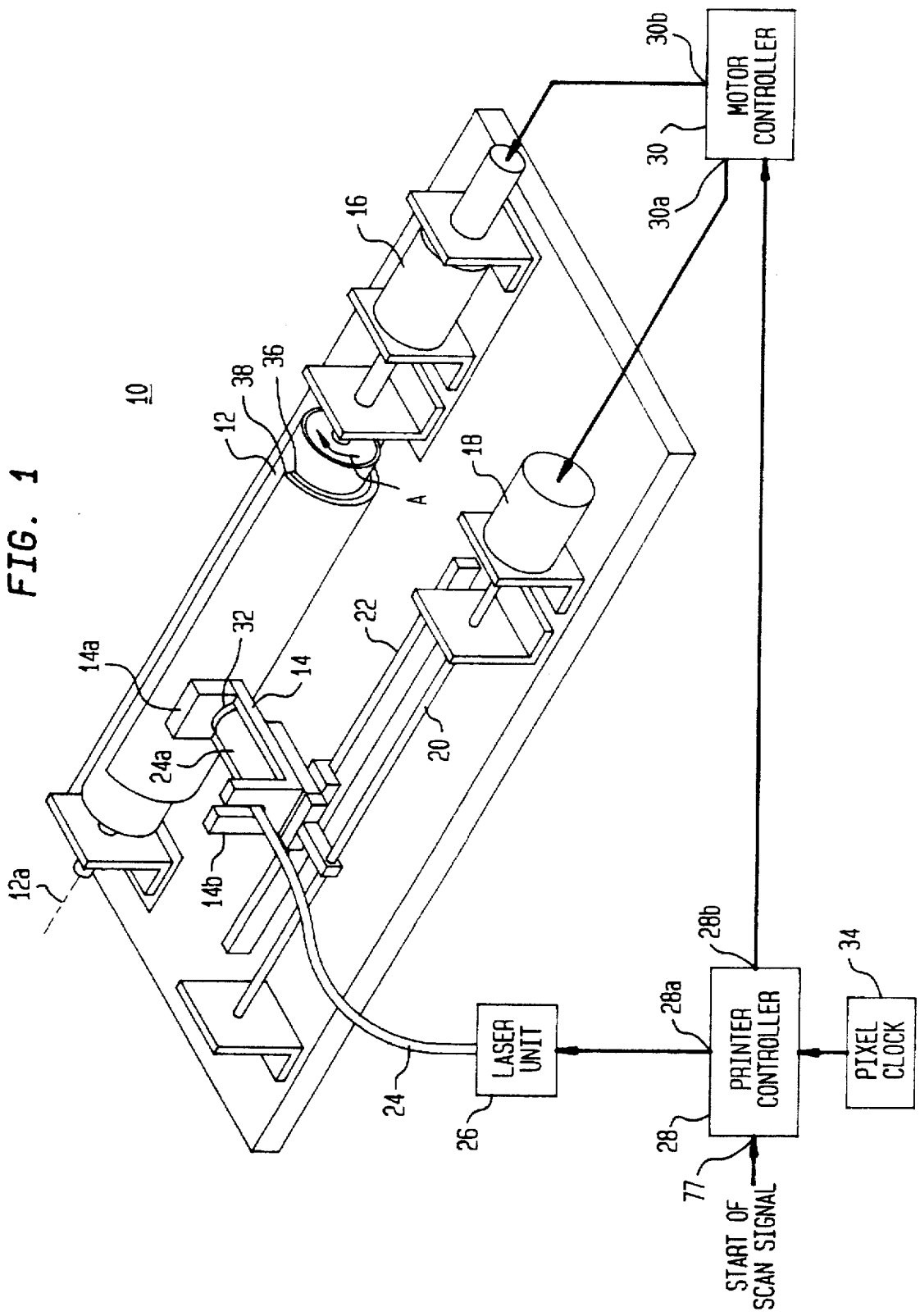
FIG. 1 is a schematic drawing of an exemplary laser printer in accordance with the present invention.

Referring now to FIG. 1, there is shown an exemplary arrangement of a printer 10 in accordance with the present invention. The printer 10 comprises a drum 12 having a longitudinal axis 12a, a printhead 14 comprising first and second end flanges 14a and 14b, respectively, a drum motor 16, a translator motor 18, a lead screw translator 20, a support rail 22 for the printhead 14, a bundle 24 of optical fibers, a laser unit 26, a printer controller 28, a motor controller 30, a variable magnifying means 32 which preferably is a fixed conjugate focal point zoom lens mounted in the first flange 14a of the printhead 14, and a pixel clock 34. The drum 12 supports a receiver member 36 such as a sheet of paper onto which an image is transferred from each one of a set of dye donor members 38 on the receiver member 36. More particularly, each of the dye donor members 38 of the set of dye donor members is formed with a different dye or ink thereon such as yellow, magenta, or cyan. The dye donor members 38 of the set of dye donor members are sequentially placed in contact with the receiver member 36 to print a separate superimposed dye frame on the receiver member 36. When all of the dye donor members 38 of the set are used in sequential printing the superimposed dye frames, a complete image is formed on the receiver member 36.

The printhead 14 is arranged to align the bundle 24 of optical fibers coming from the laser unit 26 into a predetermined array 24a of optical fibers disposed between the first and second flanges 14a and 14b, respectively. The fixed conjugate focal point zoom lens 32 is mounted in the first flange 14a between an end of the predetermined array 24a of optical fibers and the dye donor member 38 mounted on the receiver member 36 on the drum 12. The fixed conjugate focal point zoom lens 32 functions to provide an image of an instantaneous light pattern produced at the end of the predetermined array 24a of optical fibers onto the dye donor member 38 with a selective amount of magnification. Image information or data is brought to the printhead 14 from the laser unit 26 via the bundle 24 of optical fibers and the predetermined array 24a of optical fibers. The printer controller 28 is coupled at first and second outputs 28a and 28b to inputs of the laser unit 26 and the motor controller 30, respectively. The motor controller 30 is coupled at first and second outputs 30a and 30b to the drum motor 16 and the translator motor 18, respectively.

At the start of a printing process, the printhead 14 is moved parallel to the longitudinal axis 12a of the drum 12 by a lead screw translator 20 which is rotated by the translator motor 18 as the images are formed on the dye donor member 38. Concurrent therewith, the drum 12 is rotated in the direction designated by the arrow "A" by the drum motor 16.

Figure 2:
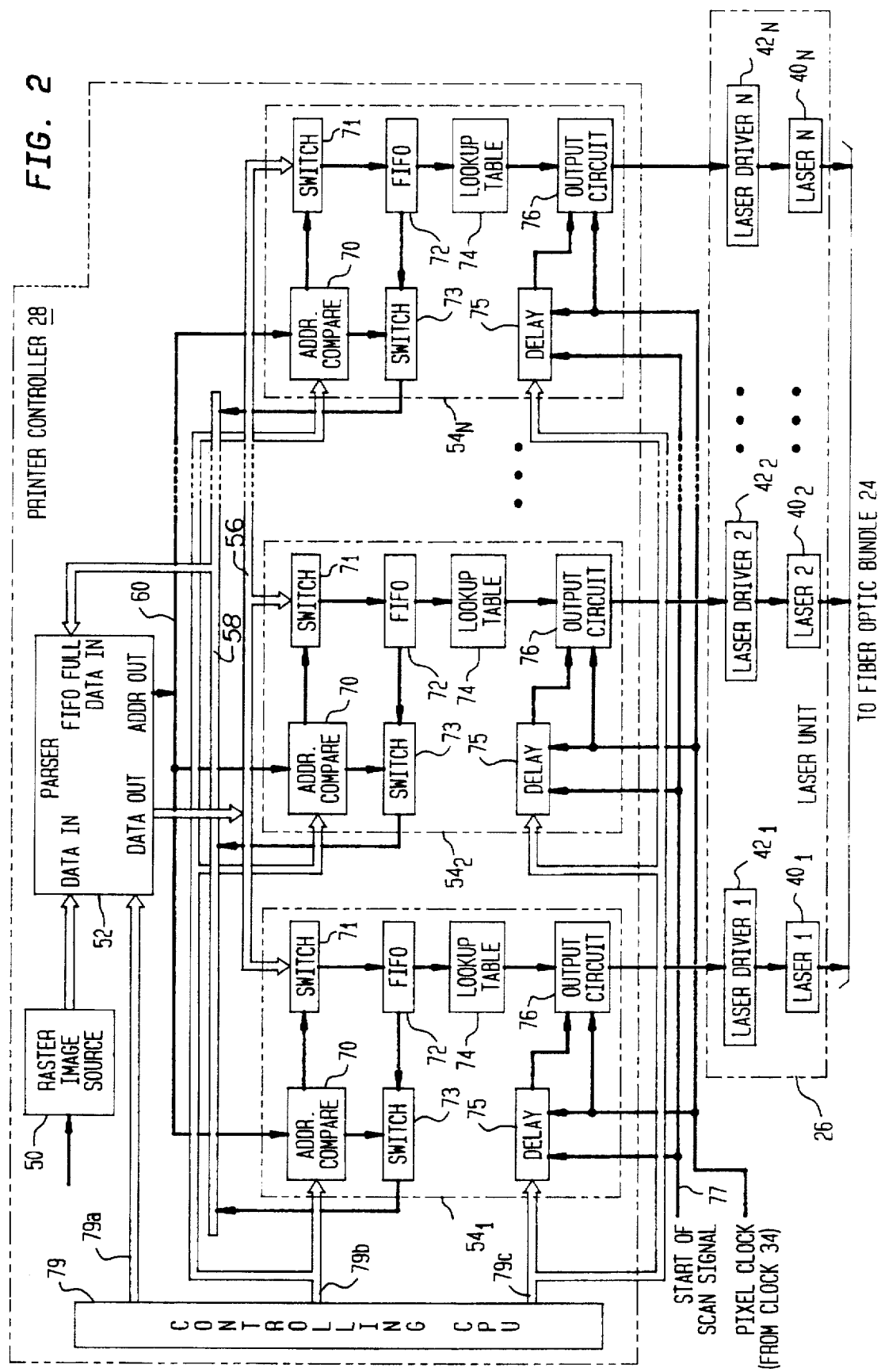
FIG. 2 is a block diagram of a printer controller and laser unit of the laser printer of FIG. 1 in accordance with the present invention.

Referring now to FIG. 2, there is shown a block diagram of the laser unit 26 (shown within a dashed line rectangle) and the printer controller 28 (shown within the dashed line block) of the laser printer 10 of FIG. 1 in accordance with the present invention. The laser unit 26 comprises a plurality of N lasers $40_1$ to $40_N$, and a corresponding plurality of N laser drivers $42_1$ to $42_N$. Each of the N lasers $40_1$ to $40_N$ is coupled to a separate corresponding one of the N laser drivers $42_1$ to $42_N$. For simplicity, only laser drivers $42_1$, $42_2$ and $42_N$ and the associated lasers $40_1$, $40_2$, and $40_N$ are shown. Each of the lasers drivers $42_1$ to $42_N$ receive separately processed image data from the printer controller 28, and uses such data to modulate the light from the associated laser 40 as is well known in the art. The modulated light from the array of diode lasers $40_1$ to $40_N$ is delivered via the bundle 24 and the predetermined array 24a of optical fibers, and the zoom lens 32 onto the dye donor member 38 (shown in FIG. 1) in order to print the image represented by the data on the receiver member 36 (shown in FIG. 1).

The printer controller 28 comprises a Raster Image Source (RIS) 50, a parser 52, a plurality of N Laser Data Channel circuits $54_1$ to $54_N$ (each Channel circuit being shown within a dashed line rectangle with only Channel Circuits $54_1$, $54_2$, and $54_N$ being shown), a first and a second bus 56 and 58, an address lead 60, a Start of Scan signal lead 77, and a Controlling Central Processing Unit (CPU) 79. Although the Raster Image Source (RIS) 50 is shown as part of the printer controller 28, it is to be understood that the RIS 50 can be disposed remote from the printer controller 28 for supplying image data to the parser 52. The parser 52 comprises first and second inputs for receiving image data from the RIS 50 and each of the N Laser Data Channel Circuits 54 via second bus 58, respectively, and first and second outputs that provide image data and addresses, respectively, to each of the N Laser Data Channel Circuits $54_1$ to $54_N$ via the respective first bus 56 and address lead 60.

Each of the N Laser Data Channel Circuits $54_1$ to $54_N$ comprises address compare means (ADDR. COMPARE) 70, first switching means (switch) 71, First-In-First-Out (FIFO) means 72, second switching means (SWITCH) 73, a Lookup Table 74, delay means (DELAY) 75, and an output circuit 76. The address compare means 70 receives addresses from the parser 52 via the address lead 60, outputs a first selective enabling signal to the first switching means 71 via a first output, and outputs a second selective enabling signal to the second switching means 73 via a second output. The first switching means 71 is responsive to the first selective enabling signal from the first output of the address compare means 70 to pass image data currently received on the first bus 56 to the FIFO 72. The FIFO 72 stores a plurality of bits of image data forming at least one line of image data, and outputs the oldest received bit of data stored therein to the Lookup table 74 when requested from the output circuit 76. A second output from the FIFO 72 provides an output signal indicating whether the FIFO 72 is full of data or not to the second switching means 73 for transmission via the second bus 58 to the second input of the parser 52 when enabled by an enabling signal from the second output of the address compare means 70.

The Lookup Table 74 receives each bit of data outputted by the FIFO 72, and generates an output signal to the output circuit 76 based on such received data bit. Each of the Lookup Tables 74 in the plurality of N Laser Data Channel Circuits $54_1$ to $54_N$ function to balance differences between the lasers $40_1$ to $40_N$ in the laser unit 26. More particularly, it is expected that all pixels of the image data having the same data value will produce a same density of a printed pixel on the receiver member 36 (not shown) mounted on the drum 12 (shown in FIG. 1), and that there is some relationship (usually linear) between the possible data values. In other words, each of the lasers $40_1$ to $40_N$ are capable of receiving each of the possible data values from the associated one of the Laser Data Channel Circuits $54_1$ to $54_N$, and are expected to mark the associated dot on the receiver member 36 with the correct density value for each of the possible data values. A first problem is that not all of the diode lasers $40_1$ to $40_N$ have precisely the same characteristics as all of the other lasers. As a result, all of the diode lasers $40_1$ to $40_N$ will not mark a dot on the receiver member 36 on the drum 12 with a same density value for a given input data value. To overcome this first problem, the lasers $40_1$ to $40_N$ are equalized by the use of the Lookup Tables 74 in the Laser Data Channel Circuits $54_1$ to $54_N$, respectively. A second problem is that there can be a nonlinear relationship between the input data values and the density values printed by such data values. This is caused by a plurality of different factors such as the characteristics of the lasers $40_1$ to $40_N$, the media (the dye donor member 38 and the receiver member 36), the optics, etc. To overcome this second problem, each Lookup Table 74 maps out and linearizes such nonlinear relationships.

The delay means 75 and the output circuit 76 are driven by a synchronous pixel clock 34 (shown in FIG. 1) that is phase-locked to the rotation of the drum 12 (shown in FIG. 1). This ensures a good swath-to-swath alignment in a fast scan direction corresponding to the rotation of the drum 12 as shown by the arrow designated "A" in FIG. 1. More particularly, it is to be understood that with a linear array of N diode lasers $40_1$ to $40_N$, all of the channels (pixels from the lasers $40_1$ to $40_N$) may not be on a same perpendicular line in a slow scan direction parallel to the longitudinal axis 12a the drum 12. To compensate for this, the delay means 75 counts a programmed number of pixel clock cycles (pulses) after a start of scan signal is received on lead 77 as is explained hereinafter.

Using the printer controller 28 and the fixed conjugate focal point zoom lens 32 (shown in FIGS. 1, 4, and 5), a simple and easy technique is provided for changing dot density in dot per inch (DPI) and dot size in a multi-beam or multi-channel printing system (such as a multi-fiber array printing system). In prior art printing systems, a screen dot is divided into a matrix of smaller microdots to achieve a gray scale in halftone printing. Typically, a screen dot is composed of an n-by-n (n×n) microdot matrix for providing $n^2$ steps of gray levels. For example, an 1800 microdot per inch (MDPI) printer can be produced using 150 screen dots with each dot having a 12×12 microdot matrix, or 300 screen dots with each dot having a 6×6 microdot matrix.

However, in accordance with the present invention, each microdot is further subdivided into an m×m matrix. In other words, the n×n microdot matrix for each screen dot becomes an (n×n)(m×m) sub-microdot matrix. With such sub-microdot matrixing, the printing pixel density becomes (n)(m)(S), where S is the screen ruling density [e.g., having a range between 75 and 300 screen dots per inch (SDPI)]. For purposes of explanation, it is assumed that the printer 10 of FIG. 1 is capable of printing, for example, a set of eight distinctive microdot densities of 3600, 1800, 1200, 900, 720, 600, 450, and 300 microdots per inch (MDPI) using 1×1, 2×2, 3×3, 4×4, 5×5, 6×6, 8×8, and 12×12 sub-microdot matrixing, respectively.

Figure 4:
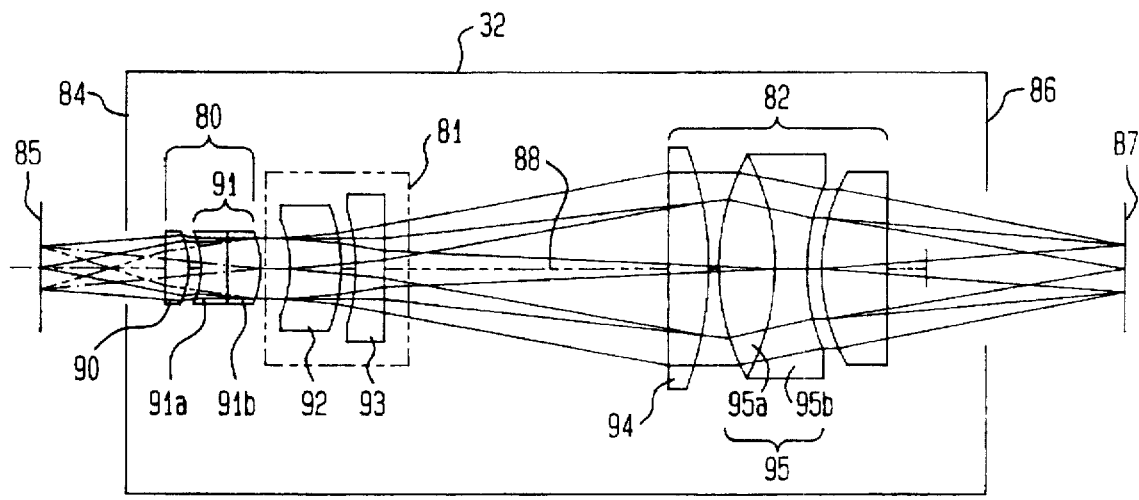
FIG. 4 is a side view of lenses in an exemplary zoom lens used in the laser printer of FIG. 1 for providing a first predetermined magnification.
Figure 5:
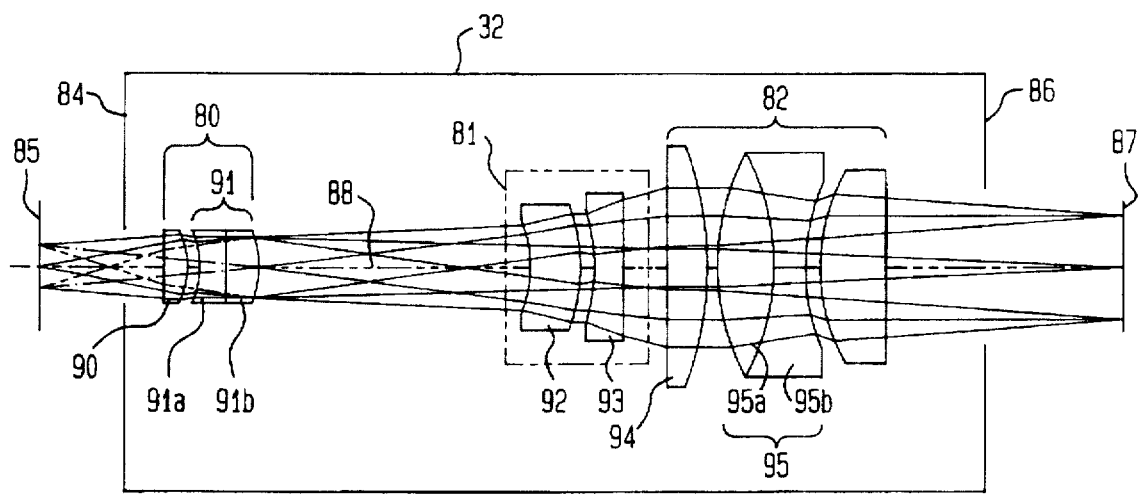
FIG. 5 is a side view of lenses of the exemplary zoom lens of FIG. 4 used in the laser printer of FIG. 1 for providing a second copy predetermined magnification.

Additionally, in accordance with the present invention, other printing microdot densities between the above-mentioned 3600, 1800, 1200, 900, 720, 600, 450, and 300 NDPI microdot densities are achieved using the fixed conjugate focal point zoom lens 32 (shown in FIGS. 1, 4 and 5). For example, if a dot density of 2400 MDPI is desired, the fixed conjugate focal point zoom lens 32 is adjusted to magnify an 3600 MDPI printer 10 set-up to produce the desired 2400 MDPI dot density. Therefore, the combination of sub-microdot matrixing and optical magnification or demagnification using a fixed conjugate focal point zoom lens 32 permits the printer 10 to cover a large number of dot and microdot sizes and screen dot densities in accordance with the present invention.

It is to be understood that to make a variable pixel density halftone printer 10, the line spacing or written dot size has to be able to be changed. Additionally, in a multi-fiber array printing head or a multi-beam printer, the optical magnification has to be changed in order to change the dot size or density. This requires a complicated optical system or the zoom lens 32 which are each generally found to have a limitation on the range of optical magnification change. Additionally, it is very difficult to cover a dot density ranging from 300 MDPI to over 3600 MDPI. In accordance with the present invention, the use of sub-microdot matrixing, as described hereinbefore, overcomes this difficulty. More particularly, to change the dot density, the data is altered accordingly for each of the lines of the image. For performing halftone printing at, for example, 1800 MDPI, the image data has to repeat itself in both the slow and fast scan directions. For 1800 MDPI halftone printing, this becomes the 2×2 sub-microdot matrixing in accordance with the present invention. Since microdot and sub-microdot matrixing is performed, several steps can be exchanged for rerouting input data.

In accordance with the present invention, the input data has to be rerouted to the grouping of sub-microdot matrixing. For example, if 2×2 sub-microdot matrixing is used, two adjacent lines are fed the same image data in the slow scan direction (along a longitudinal axis 12a of the drum 12), and the pixel clock 34 is halved so that each dot is twice as long in the fast scan direction (direction of rotation of the drum 12 in FIG. 1). If 3×3 sub-microdot matrixing is used, 3 adjacent lines are fed the same image data in the slow scan direction. In other words, the sub-microdot matrixing technique requires stretching (in the fast scan direction) and duplicating (in the slow scan direction) the data in two dimensions.

In operation, the image data is supplied by the Raster Image Source (RIS) 50 as a serial stream, one line after another. The line direction of the image data supplied by the RIS 50 is aligned with the fast scan direction (arrow A in FIG. 1) of printer 10. The data stream from the RIS 50 is parsed by the parser 52 so that, as a general concept, one line of image data goes to one print channel (e.g., Laser Data Channel Circuit $54_1$), the next line of data to the next print channel (e.g., Laser Data Channel Circuit $54_2$), etc. For each of the multiple Laser Data Channel Circuits $54_1$ to $54_N$, the FIFO 72 therein holds the data for a present line while other elements (not shown) in the parser 52 are being loaded with an additional line of data. Once all of the Laser Data Channel Circuits $54_1$ to $54_N$ are holding (in their FIFOs 72) one line of dots (data), printing is started.

To duplicate the data in the slow scan direction (along the longitudinal axis 12a of the drum 12), the parser 52 is reprogrammed so that it sends the data to multiple print channels at the same time. More particularly, if the printer 10 is writing at it's maximum resolution (e.g., 3600 MDPI using 1×1 sub-microdot matrixing), then the parser 52 acts normally to send a first line of data to Laser Data Channel Circuit $54_1$, a next line of data to the next subsequent Laser Data Channel Circuit $54_2$, etc. If the resolution is halved to 1800 MDPI (using 2×2 sub-microdot matrixing), then the parser 52 sends a first line of data to the first and second Laser Data Channel Circuits $54_1$ and $54_2$, respectively, a second line of data to the third and fourth Laser Data Channel Circuits $54_3$ and $54_4$, respectively, etc. The parser 52 still only sends each line of data once. The address compare means 70 of the first and second Laser Data Channel Circuits $54_1$ and $54_2$ are loaded with the same value (address) so that when the parser 52 transmits this address on line 60, both Channel Circuits $54_1$ and $54_2$ enable their first and second switching means 71 and 73. As a result, both Laser Data Channel Circuits $54_1$ and $54_2$ receive the data sent by the parser 52 on line 56, and both Laser Data Channel Circuits $54_1$ and $54_2$ send full flag signals to the parser 52 via bus 58 to throttle the transfer. If the resolution is set to 1200 MDPI (using 3×3 sub-microdot matrixing), then a first line of data is sent to the first, second, and third Laser Data Channel Circuits $54_1$, $54_2$, and $54_3$, respectively, the second line of data is sent to the fourth, fifth, and sixth Laser Data Channel Circuits $54_4$, $54_5$, and $54_6$, respectively, etc.

With regard to the duplication of data in the fast scan direction (rotation direction of drum 12 of FIG. 1), the data is shifted out in the fast scan direction with reference to the pixel clock 34 which is phase-locked to the rotation of drum 12, or with reference to an open loop clock (not shown). For example, it is assumed that the pixel clock 34 (or the open loop clock) has a frequency of $f_0$ when writing at a maximum resolution (e.g., 3600 MDPI). Then if the frequency is halved to $f_0/2$ while the speed of rotation of the drum 12 remains constant, each micropixel is twice as long in the fast scan direction. Therefore, the duplication in the fast scan direction does not require the creation of more or duplicated data, but is accomplished by making the available data last longer.

The Controlling CPU 79 functions to inform (a) the parser 52 of the number of effective channels to be used based on a selected matrix (e.g., 1×1, 2×2, etc.) via lead 79a, (b) the address compare means 70 of the channel address for each of the Laser Data Channel Circuits $54_1$ to $54_N$ based on the selected matrix via bus 79b, and (c) the delay means 75 of the delay to be used for each of the Laser Data Channel Circuits $54_1$ to $54_N$ based on the magnification of the zoom lens 32 via bus 79c.

Figure 3:
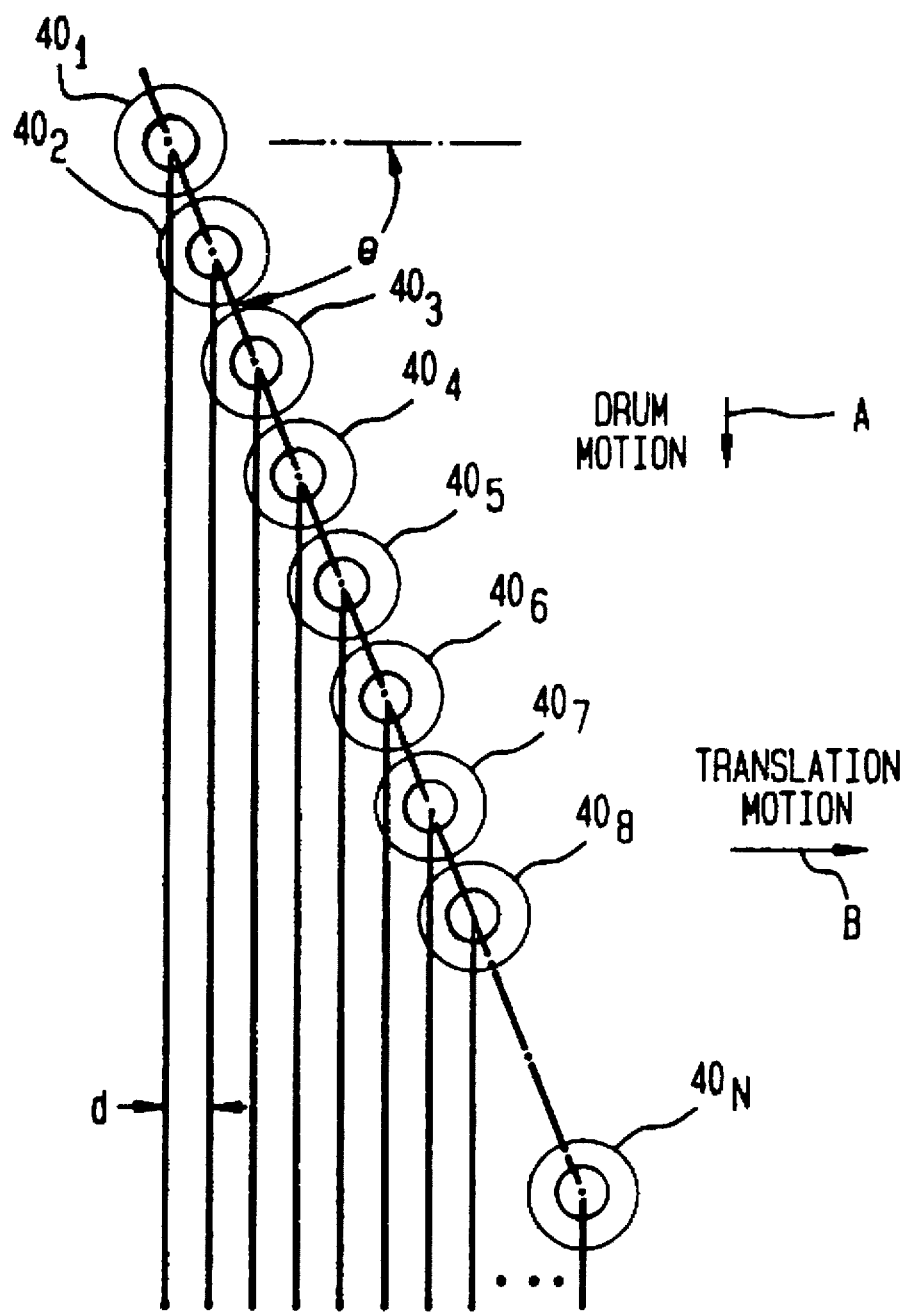
FIG. 3 shows an exemplary arrangement of a plurality of lasers in the laser printhead of the laser printer of FIG. 1 in accordance with the present invention.

Referring now to FIG. 3, there is shown an arrangement of a plurality of N lasers $40_1$ to $40_N$, of which lasers $40_1$, $40_2$, $40_3$, $40_4$, $40_5$, $40_6$, $40_7$, $40_8$, and $40_N$ are shown, for purposes of explanation of the delay circuits 75 and output circuits 76 of FIG. 2. The arrangement of present FIG. 3 and its description are extensively disclosed in copending U.S. Pat. No. 5,258,776 (T. A. Mackin et al), issued on Nov. 2, 1993, where the present FIG. 3 is shown in the copending patent application as FIG. 4. The following description of present FIG. 3 is taken from a pertinent portion of the description provided in the copending application.

The plurality of lasers $40_1$ to $40_N$ are aligned and equally spaced to produce a correspondingly aligned and predetermined spaced set of laser light beams on the dye donor member 38 (shown in FIG. 1). The line of lasers $40_1$ to $40_N$ are oriented at a predetermined acute angle θ to the width of the receiver member 36 mounted on drum 12 in FIG. 1 corresponding to a line perpendicular to the direction of rotation A of the drum 12. More particularly, due to the smallness of the micropixels that are being written at 1800 MDPI (0.000556 inch/micropixel), a conventional printhead that provides light beams oriented parallel to the width of the receiver member 36 on the drum 12 cannot be built to provide the close micropixel spacing needed for printing. By adjusting the angle θ of the line of lasers $40_i$ to $40_N$ in FIG. 3 and the resulting light beams, the horizontal distance "d" between lasers $40_1$ to $40_N$ along the direction of translation motion shown by the arrow B can be made as small as necessary. The horizontal spacing "d" between adjacent lasers 40 represents the micropixel density of the image being printed on the receiver member 36 mounted on the drum 12. The number "N" of lasers 40 that are used in the laser unit 26 is determined by economies of scale only. The laser printer 10 will work whether there are two or two hundred lasers 40 for any size image. The trade off is the cost of the extra elements versus the speed at which the thermal printer 10 can print. Factors which make such determination are, for example, the micropixel size, the diameter of the drum 12, and the ability of the lasers 40 to focus their light beams onto the dye donor member 38 on the drum 12 (shown in FIG. 1).

In order to print dots (micropixels) at, for example, 1800 MDPI, to create 4-color images on a receiver member 36, the laser printer 10 must maintain, for example, a ±1/8 micropixel resolution. By providing a ±1/8 micropixel resolution (R) in a 4-color image, the error cannot be detected by the human eye or by magnifications normally used in the graphic arts field (e.g., magnifications of 7×–20×). The laser printer 10 controls micropixel resolution to this tolerance by close synchronization of the position of the drum 16 and the pixel timing pulses from the pixel clock 30.

During the printing operation, the drum 12 is rotated at a continuous speed in the direction of the arrow A shown in FIGS. 1 and 3. Simultaneously therewith, the printhead 14 including the light beams from the plurality of lasers $40_0$ to $40_N$ is translated at a slower speed across the drum 12 in the direction shown by arrow B of FIG. 3. Each of the plurality of laser $40_1$ to $40_N$ associated with the laser printhead 14 writes a separate column of micropixels during each revolution of the drum 12. As a result, the image is written in a helical form because the printhead 14 is continuously translating (moving) in the direction of the arrow B as the drum 12 rotates in the direction of arrow A. Therefore, by aligning the plurality of lasers $40_1$ to $40_N$ (and their light beams) at an acute angle θ as shown in FIG. 3, N columns of the dye frame image are concurrently written during each revolution of the drum 12.

As each of the lasers $40_1$ to $40_N$ is writing a separate column of micropixels of the dye frame image, the lasers $40_1$ to $40_N$ are timed in a sequence that causes corresponding micropixels of each column to be substantially aligned across the width of the receiver member 36 on the drum 12. In this manner, N micropixels of each line of a dye frame image are written onto the receiver member 36 during each rotation of the drum 12. More particularly, in FIG. 3, when the first row of a dye frame image is started, the first laser $40_1$ is energized (fired), and the drum 12 is moved a predetermined distance in direction of arrow A before the second laser $40_2$ is fired to place the two micropixels next to each other with the proper spacing. The delay between the firing of the first laser $40_1$ and the second laser $40_2$ takes a predetermined plurality of pulses of the pixel clock 34. Such delay can be determined by those skilled in the art knowing various laser printer 10 factors such as the circumference of the drum 12, the rotational speed of the drum 12, the spacing of the light beams from the lasers $40_1$ to $40_N$ from the printhead 14, and the angle θ at which the light beams from the printhead 14 are disposed relative to a line perpendicular to the direction of rotation of the drum 12. The number (N) of lasers 40 does not effect the delay values. By repeating this process for each of the other lasers $40_3$ to $40_N$, N micropixels of the first row across the receiver member 36 mounted on drum 12 are printed.

For printing each of the second, third, and other rows of the dye frame image, the laser $40_1$ is fired sequentially at predetermined intervals synchronized to the rotational speed of the drum 12. More particularly, the laser $40_1$ is fired every time the drum 12 moves a predetermined distance corresponding to the distance between each of the rows of the dye frame image. After the first laser $40_1$ is fired for each row of the dye frame image, the remaining lasers $40_2$ to $40_N$ are fired in the same timed sequence as described above for printing the first row of the dye frame image. In this manner, the lasers $40_1$ to $40_N$ are energized for printing the N columns of the rows of a dye frame image during each rotation of the drum 12. During each subsequent revolution of the drum 12, and while the printhead 14 is continuing its translation in the direction of arrow B, the next sequential plurality of N columns of the rows of the dye frame image, in the direction of translation motion of the printhead 14, are printed. These next sequential plurality of N columns are timed to be printed next to the corresponding rows printed during the prior revolutions of the drum 12, until the entire dye frame image is completed.

The pulses of the pixel clock 34 are the means used to determine how long to delay the second laser $40_2$ from firing after the first laser $40_1$ has fired, and similarly how long to delay each of the other lasers $40_3$ to $40_N$ before they are fired. It is to be understood that during each revolution of the drum 12, the start of printing of a next set of N columns of micropixels, or the start of a next dye frame image, is synchronized to print the micropixels with a 1/R (R=8) micropixel resolution. It is to be further understood that during the printing of dye frame images of different colors on the same receiver member 36 mounted on drum 12, the laser printer 10 preferably superimposes corresponding micropixels of the different colors with the 1/8 micropixel resolution.

Returning again to FIG. 1, it is to be understood that all of lasers $40_1$ to $40_N$ associated with the plurality of N Laser Data Channel Circuits $54_1$ to $54_N$, respectively, may not have their light beams located on the same substantially perpendicular line (perpendicular to the rotation of the drum 12). The delay circuit 75 in each of the plurality of N Laser Data Channel Circuits $54_1$ to $54_N$ is provided to compensate for such off-perpendicular alignment. More particularly, the delay circuit 75 counts a programmed number of cycles from the pixel clock 34 after a start of scan signal is received on the lead 77 before enabling the output circuit 76 to start shifting out data from the FIFO 72 via the lookup table 74. If the printhead 14 provides a linear array of laser light beams that is tilted at some angle θ (as shown in FIG. 3) to get the proper line-to-line spacing, then each channel has a unique value programmed into its delay circuit 75. Synchronous output enable pulses from the delay circuit 75 are usually some multiple of the clock rate of the pixel clock 34. This allows the delay circuit 75 to better align the output signals to the laser unit 26 from the Laser Data Channel Circuits $54_1$ to $54_N$.

For example, assume that the projection of the printing elements (pixels) on the receiver member 36 on drum 12 results in a separation of 3.33 pixels from laser-to-laser 40 in a linear laser printer 10. For such printer 10, the following theoretical delays from a start of scan signal on lead 77 shown in Table A are required for each of the Laser Data Channel Circuits $54_1$ to $54_N$.

TABLE A

| Channel 0: | 0 pixels | Channel 6: | 19.98 pixels |
| Channel 1: | 3.33 pixels | Channel 7: | 23.31 pixels |
| Channel 2: | 6.66 pixels | Channel 8: | 26.64 pixels |
| Channel 3: | 9.99 pixels | Channel 9: | 29.97 pixels |
| Channel 4: | 13.32 pixels | Channel 10: | 33.30 pixels |
| Channel 5: | 16.65 pixels | Channel 11: | 36.63 pixels |

If the delay circuit 75 is driven by a clock that is equal to the pixel clock 34 rate, then the best channel alignment attainable for the Laser Data Channel Circuits $54_1$ to $54_N$ is as shown in Table B.

TABLE B

| Channel 0: | 0 pixels | Channel 6: | 20 pixels |
| Channel 1: | 3 pixels | Channel 7: | 23 pixels |
| Channel 2: | 6 pixels | Channel 8: | 27 pixels |
| Channel 3: | 9 pixels | Channel 9: | 30 pixels |
| Channel 4: | 13 pixels | Channel 10: | 33 pixels |
| Channel 5: | 16 pixels | Channel 11: | 37 pixels |

However, if the delay circuit is driven be a clock that is eight times the rate of the pixel clock 34, then the following channel alignment attainable for the Laser Data Channel Circuits $54_1$ to $54_N$ is shown in Table C.

TABLE C

| Channel 0: | 0 pixels | Channel 6: | 20.00 pixels |
| Channel 1: | 3.375 pixels | Channel 7: | 23.25 pixels |
| Channel 2: | 6.625 pixels | Channel 8: | 26.625 pixels |
| Channel 3: | 10.000 pixels | Channel 9: | 30.00 pixels |
| Channel 4: | 13.375 pixels | Channel 10: | 33.25 pixels |
| Channel 5: | 16.625 pixels | Channel 11: | 36.625 pixels |

Parsing the same data by the parser 52 to the Laser Data Channel $54_1$ to $54_N$ channels 54 decreases the resolution in the line scan direction (slow scan perpendicular to the rotation of drum 12). A corresponding change is required in the pixel scan direction (fast scan direction in the rotational direction of drum 12) as well. This is accomplished by changing the number of synchronous clock pulses per revolution of the drum 12. and is accomplished by altering parameters in phase-lock circuitry (not shown) within the pixel clock 34. An exemplary arrangement for the pixel clock 34 is shown in FIG. 2 of the hereinabove mentioned copending U.S. Pat. No. 5,258,776 which is incorporated herein by reference. For example, it is assumed that the phase-lock circuitry of the pixel clock 34 is designed to give "m" synchronous clock pulses per revolution of the drum 12 when printing at a maximum resolution (e.g., 3600 MDPI) to provide a predetermined pixel size. If the parameters of the phase-lock circuitry are changed to obtain only m/2 clock pulses per revolution, then each pixel is twice as long in the fast scan direction. This is a desired result for printing at one-half of the maximum resolution. The same logic applies for printing at all other resolutions. Therefore, the duplication in the fast scan direction does not require a creation of more data. Rather, duplication in the fast scan direction is accomplished by making the available data last longer.

Referring now to FIG. 4, there is shown a side view of the lenses forming an exemplary zoom lens 32 used in the laser printer 10 of FIG. 1 which is adjusted to provide a first predetermined magnification. The zoom lens 32 comprises a first set of lenses (shown under the bracket 80), a second set of lenses (shown within a dashed line rectangle 81), a third set of lenses (shown under the bracket 82), a first end 84 for receiving light rays from a first conjugate plane 85, a second end 86 for focusing the light rays passing through the zoom lens 32 onto a second conjugate plane 87, and a longitudinal axis 88. The first set of lenses 80 comprises a planar/convex lens 90 disposed adjacent the first end 84 of the zoom lens 32, and a concave/convex lens 91 for receiving light rays refracted by the lens 90. The concave/convex lens 91 is formed of a first concave/planar lens 91a and a second planar/convex lens 91b which have their planar ends abutting each other. The concave end of the lens 91a is disposed in a fixed relationship to the convex end of the lens 90. Additionally, the first set of lenses 80 are disposed in a fixed relationship to the first end 84 of the zoom lens 32.

The second set of lenses 81 is movable along the longitudinal axis 88 of the zoom lens 32 between the first set of lenses 80 and the third set of lenses 82. The second set of lenses 81 comprises a concave/convex lens 92 for receiving the light rays refracted by the first set of lenses 80 at its concave surface, and a concave/planar lens 93 which is disposed to receive the light refracted by the lens 93 at its concave surface and has a fixed relationship to the lens 93. The second set of lenses 81 is positioned near the first set of lenses 80 to provide a predetermined magnification (e.g., a magnification of 1) for the zoom lens 32.

The third set of lenses 82 comprises a convex/convex lens 94 for receiving light rays from the second set of lenses 81, a convex/concave lens 95 for receiving the light rays refracted by the lens 94, and a convex/concave lens 96 for receiving the light rays refracted by the lens 95 and focusing the light rays leaving the lens 96 onto the second conjugate plane 87. The convex/concave lens 95 comprises a first convex/convex lens 95a which abuts a second concave/concave lens 95b. The third set of lenses 82 is disposed in a fixed relationship to the second end 86 of the zoom lens 32, and each of the lenses 94, 95, and 96 are disposed in a fixed relationship to each other. It is to be understood that the first conjugate plane 85 represents the end of the optical fiber array 24a in the printhead 14 of FIG. 1 adjacent the first flange 14a, while the second conjugate plane 87 represent the dye donor member 38 on the drum 12.

Referring now to FIG. 5, there is shown a side view of the lenses of the exemplary zoom lens 32 of FIG. 4 used in the laser printer of FIG. 1 to provide a second predetermined magnification. The lens 32 shown in FIG. 5 has the same internal lens configuration and number designations as shown for the zoom lens 32 in FIG. 4. To provide the second predetermined magnification (e.g., a magnification of 2), the second section 81 is moved along the longitudinal axis 88 to adjacent the third set of lenses 82. As shown in FIGS. 4 and 5, by changing the magnification of the zoom lens 32 from a minimum magnification of, for example, 1 times (shown in FIG. 4) to a maximum magnification of, for example, 2 times (shown in FIG. 5), the dot spacing (density in microdots per inch) is varied at the second conjugate plane 87. Therefore, if the zoom lens 32 has a maximum power (magnification) of 2, any dot density from 300 MDPI to 3600 MDPI can be achieved using the combination of submicrodot matrixing and variable zoom lens 32 magnifications. For example, a dot density of 2400 NDPI microdot matrixing is achieved in accordance with the present invention by setting the printer controller 28 to provide 3600 MDPI microdot matrixing and magnifying the 3600 MDPI to 2400 MDPI using the zoom lens set at a magnification of 1.5.

Figure 6A:
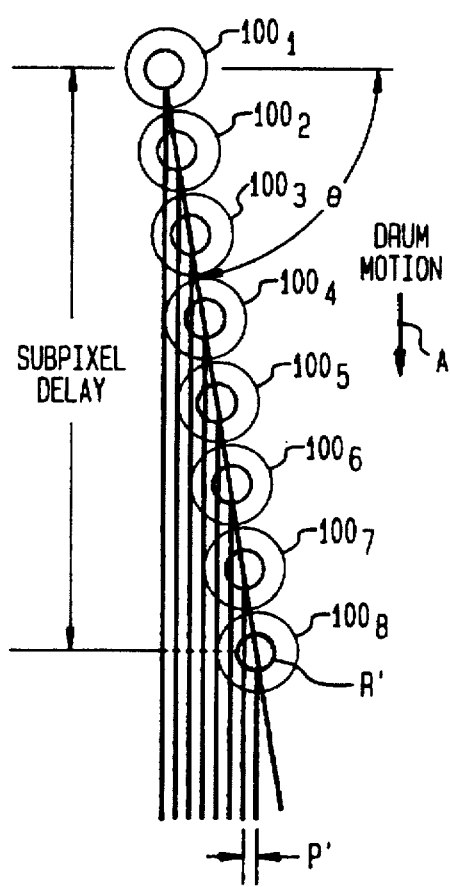
FIGS. 6A and 6B show images of the lasers of FIG. 3 at a print medium of the exemplary laser printer of FIG. 1 for magnifications of 1 and 1.5, respectively, provided by a zoom lens of the exemplary laser printer.
Figure 6B:
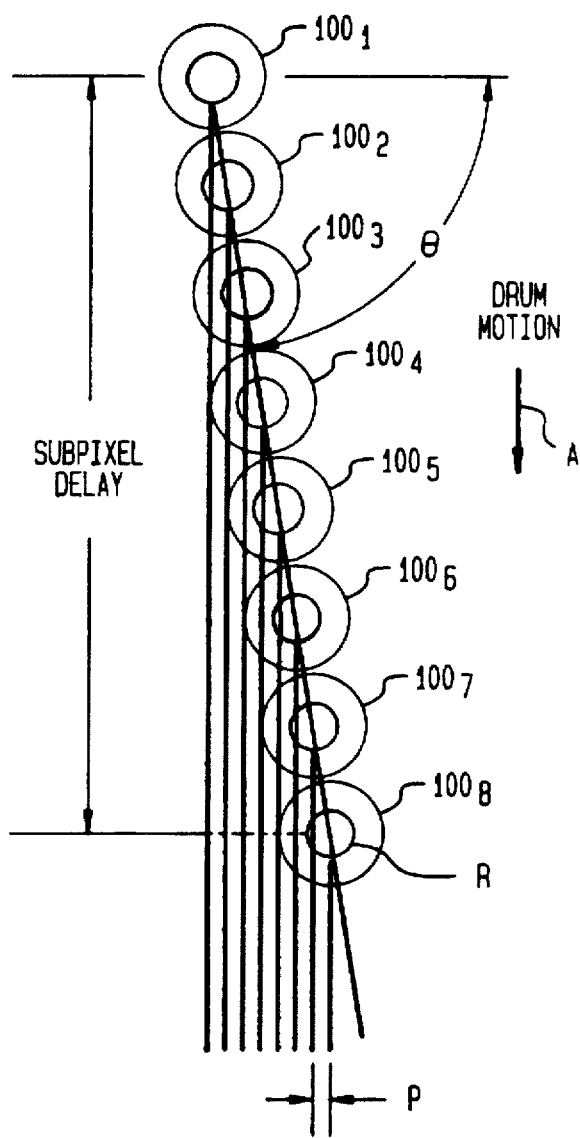

Referring now to FIGS. 6A and 6B, there are shown images $100_1$ to $100_8$ of only the lasers $40_1$ to $40_8$, respectively, of FIG. 3 at the dye donor member 38 of the exemplary laser printer 10 of FIG. 1 for magnifications of 1 and 1.5, respectively, provided by the zoom lens 32. By changing the magnification from a value of one to a value of 1.5, a line spacing P' and a radius R (shown in FIG. 6A) are changed to a line spacing of P and a radius of R (shown in FIG. 6B) by a factor of 1.5. It is understood that with a change in magnification, both the printhead setting angle θ, and a spot overlap ratio B (which is an important parameter to hide the raster line visibility) defined by the equation $B=2R/P=2R'/P'$ are not changed. A time delay between a subpixel (provided by the delay means 75 in the N Laser Data Channel circuits $54_1$ to $54_N$) is changed accordingly, but the time delay is easily adjusted by printer controller 28 software in the controlling CPU 79. By the combination of submicro-pixeling and a zooming change of the magnification of the zoom lens 32, the printer 10 can change the pixel density for an extremely wide range from 300 to 3600 MDPI without any difficult hardware setting changes. Therefore, the printer 10 can print halftone images which require very high pixel density from 100 to 3600 DPI and continuous tone images which require a relatively low pixel density typically from 150 to 600 DPI. It is to be understood that the magnification setting of the zoom lens 32 is preferably performed automatically when a printer operator inputs a MDPI value between 300 and 3600 MDPI.

It is to be appreciated and understood that the specific embodiments of the invention described hereinabove are merely illustrative of the general principles of the invention. Various modifications may be made by those skilled in the art which are consistent with the principles set forth. For example, the laser unit and the optical fiber cable and array can be formed on as part of the printhead 14, with the printer controller 28 supplying the processed image data to the laser unit via an electrical cable (not shown).

What is claimed is:

1. A laser printer for printing an image formed from a plurality of lines of dots on a receiver member mounted on a rotatable drum from received image data for each of the plurality of lines of the image, the printer comprising:

a printer controller comprising a plurality of laser data channels, the printer controller being responsive to the received image data for processing and distributing the image data for the plurality of lines of the image to the plurality of N laser data channels based on a predetermined image resolution of a set of predetermined selectable image resolutions, each predetermined image resolution of the set of predetermined image resolutions uses a separate one of a predetermined set of n-by-n microdot matrix values and a related predetermined separate m-by-m sub-microdot matrix value corresponding to the n-by-n microdot matrix values representing a predetermined microdot per inch image resolution on the receiver member, where each dot of the plurality of lines of dots forming the image is represented by an (n-by-n) (m-by-m) sub-microdot matrix;

a laser unit comprising a plurality of N lasers, each of the plurality of N lasers receiving image data from a separate laser data channel of the plurality of N laser data channels of the printer controller, for generating light rays associated with a separate row or column of the image being printed on the receiver member and for transmitting the light rays to a printhead via a fiber optic bundle; and a lens magnifying means for magnifying or demagnifying a microdot matrix value representing a first predetermined microdot per inch image resolution on the receiver member to a predetermined microdot matrix value that is equal to or between the selected microdot matrix value representing a second microdot per inch image resolution on the receiver member and a next n-by-n microdot matrix value in the predetermined set of n-by-n microdot matrix values.

2. The laser printer of claim 1 wherein the variable lens magnifying means is a fixed conjugate focal point zoom lens for imaging a light pattern at a first conjugate plane in front of the zoom lens to a second conjugate plane in back of the zoom lens.

3. The laser printer of claim 1 wherein the printer controller comprises:

a microprocessor responsive to a predetermined m-by-m sub-microdot matrix value for generating a separate predetermined programmable address to a number of m laser data channels forming a subsection of the plurality of N laser data channels;

parser means which is responsive to the received image data for transmitting both an address associated with a row or column of the image to be printed on the receiver member, and a binary pixel value obtained from the received image data for a microdot associated with the address of row or column of the image; and each laser data channel of the plurality of N laser data channels being associated with a separate one of the plurality of N lasers of the printhead comprising:

address comparison means for comparing the address transmitted by the parser means with the programmable address from the microprocessor and for permitting the binary pixel value provided by the parser means for the programmable address to enter the laser data channel when the transmitted and programmable addresses match; and processing means responsive to timing signals from a pixel clock transmitting at a predetermined frequency for processing the binary pixel value in order to compensate for characteristic and alignment variations between the associated laser and remaining ones of the plurality of lasers prior to transmitting the processed binary pixel value to the associated laser of the printhead.

4. The laser printer of claim 3 wherein, for a predetermined m-by-m sub-microdot matrix, the address comparison means in a group of m adjacent laser data channels of the plurality of N laser data channels compares the address transmitted by the parser means with a same programmable address which is different from a programmable address used by another group of m laser data channels of the plurality of N laser data channels to provide sub-microdot matrixing.

5. The laser printer of claim 3 wherein the processing means comprises:

first-in-first-out register means for storing a predetermined number of binary pixel values transmitted by the parser means; and compensation means responsive to a binary pixel value being outputted by the first-in-first-out register means for adjusting the binary pixel value to compensate for characteristic and alignment variations between the associated laser and remaining ones of the plurality of lasers.

6. The laser printer of claim 5 wherein the processing means further comprises:

delay means responsive to the timing signals from the pixel clock transmitting at the predetermined frequency for providing an enable output signal at an occurrence of a predetermined number of timing signals; and an output circuit responsive to the enable output signal to transmit the binary pixel value from the compensation means to the laser associated with the laser data channel, the predetermined number of timing signals used by each of the plurality of N laser data channels being a predetermined difference when the plurality of N lasers are not aligned parallel to a longitudinal axis of the drum.

7. A laser printer for printing an image formed from a plurality of lines of dots on a receiver member mounted on a rotatable drum from received image data for each of the plurality of lines of the image, the printer comprising:

a printer controller comprising a plurality of laser data channels, the printer controlled being responsive to the received image data for processing and distributing the image data for the plurality of lines of an image to the plurality of N laser data channels based on a predetermined image resolution of a set of predetermined selectable image resolutions, each predetermined image resolution of the set of predetermined selectable image resolutions uses a separate one of a predetermined set of n-by-n microdot matrix values and a related predetermined separate m-by-m sub-microdot matrix value corresponding to the n-by-n microdot matrix values representing a predetermined microdot per inch image resolution on the receiver member, where each dot of the plurality of lines of dots forming the image is represented by an (n-by-n) (m-by-m) sub-microdot matrix, the printer controller further comprising:

a microprocessor responsive to a predetermined m-by-m submicrodot matrix value for generating a separate predetermined programmable address to a number of m laser data channels forming a subsection of the plurality of N laser data channels;

parser means which is responsive to the received image data for transmitting both an address associated with a row or column of the image to be printed on the receiver member, and a binary pixel value obtained from the received image data for a microdot associated with the address of row or column of the image; and each laser data channel of the plurality of N laser data channels being responsive to the address and binary pixel value transmitted by the parser means for distributing the image data to achieve the predetermined image resolution on the receiver member;

a laser unit, comprising a plurality of N lasers, each of the plurality of N lasers receiving image data from a separate one of the plurality of N laser data channels of the printer controller, for generating light rays associated with a separate row or column of the image being printed on the receiver member and for transmitting the light rays to a printhead via a fiber optic bundle; and a lens magnifying means for magnifying or demagnifying a microdot matrix value representing a first predetermined microdot per inch image resolution of the receiver member to a predetermined microdot matrix value that is equal to or between the selected microdot matrix value representing a second microdot per inch image resolution of the receiver member and a next n-by-n microdot matrix value in the predetermined set of n-by-n microdot matrix values.

8. The laser printer of claim 7 wherein each of the plurality of N laser data channels of the printer controller comprises:

address comparison means for comparing the address transmitted by the parser means with the programmable address from the microprocessor for permitting the binary pixel value provided by the parser means for the programmable address to enter the laser data channel when the transmitted and programmable addresses match; and processing means responsive to timing signals from a pixel clock transmitting at a predetermined frequency for processing the binary pixel value in order to compensate for characteristic and alignment variations between the associated laser and remaining ones of the plurality of lasers prior to transmitting the processed binary pixel value to the associated laser of the printhead.

9. The laser printer of claim 8 wherein, for a predetermined m-by-m sub-microdot matrix, the address comparison means in a group of m adjacent laser data channels of the plurality of N laser data channels compares the address transmitted by the parser means with a same programmable address which is different from a programmable address used by another group of m laser data channels of the plurality of N laser data channels to provide sub-microdot matrixing.

10. The laser printer of claim 8 wherein the processing means comprises:

first-in-first-out register means for storing a predetermined number of binary pixel values transmitted by the parser means;

compensation means responsive to a binary pixel value being outputted by the first-in-first-out register means for adjusting the binary pixel value to compensate for characteristic and alignment variations between the associated laser and remaining ones of the plurality of lasers.

11. The laser printer of claim 10 wherein the processing means further comprises:

delay means responsive to the timing signals from the pixel clock transmitting at the predetermined frequency for providing an enable output signal at an occurrence of a predetermined number of timing signals; and an output circuit responsive to the enable output signal to transmit the binary pixel value from the compensation means to the laser associated with the laser data channel, the predetermined number of timing signals used by each of the plurality of N laser data channels being a predetermined difference when the plurality of N lasers are not aligned parallel to a longitudinal axis of the drum.

12. The laser printer of claim 7 wherein the variable magnifying means is a fixed conjugate focal point zoom lens for imaging a light pattern at a first conjugate plane in front of the zoom lens to a second conjugate plane in back of the zoom lens.

13. A method of printing an image formed from a plurality of lines of dots on a receiver member mounted on a rotatable drum of a laser printer from received image data for each of the plurality of lines of dots of the image, the method comprising the steps of:

(a) processing and distributing the received image data for the plurality of lines of an image to a plurality of N laser data channels based on a predetermined image resolution of a set of predetermined selectable image resolutions, each predetermined image resolution of the set of predetermined selectable image resolutions uses a separate one of a predetermined set of n-by-n microdot matrix values and a related predetermined separate m-by-m sub-microdot matrix value corresponding to the n-by-n microdot matrix values representing a predetermined microdot per inch image resolution on the receiver member, where each dot of the plurality of lines of dots forming the image is represented by an (n-by-n) (m-by-m) sub-microdot matrix;

(b) modulating light rays of each of a plurality of N lasers associated with a separate row or column of the image being printed on the receiver member using processed image data from a separate one of the plurality of N laser data channels for printing the image on the receiver member; and (c) magnifying or demagnifying a n-by-n microdot matrix value representing a first predetermined microdot per inch image resolution on the receiver member to a predetermined microdot matrix value that is equal to or between the selected microdot matrix value representing a second microdot per inch image resolution on the receiver member and a next n-by-n microdot matrix value in the predetermined set of n-by-n microdot matrix values using a variable lens magnifying means.

14. The method of claim 13 wherein in performing step (a) performing the substeps of:

(a1) generating a separate predetermined programmable address to a number of m laser data channels forming a subsection of the plurality of N laser data channels in a microprocessor that is responsive to the predetermined m-by-m sub-microdot matrix value;

(a2) parsing the received image data to each of the plurality of N laser data channels by transmitting both an address associated with a row or column of the image to be printed on the receiver member, and a binary pixel value obtained from the received image data for a microdot associated with the address of row or column of the image;

(a3) comparing the address in step (a2) with the programmable address generated in step (a1) at each laser data channel for permitting the binary pixel value for the programmable address to enter the laser data channel when the transmitted and programmable addresses match; and (a4) processing the binary pixel value in response to timing signals from a pixel clock transmitting at a predetermined frequency in order to compensate for characteristic and alignment variations between the associated laser and remaining ones of the plurality of lasers prior to transmitting the processed binary pixel value to the associated laser.

15. The method of claim 14 wherein in performing substep (a3) for a predetermined m-by-m sub-microdot matrix. comparing the address transmitted in step (a2) with a same programmable address in a group of m adjacent laser data channels of the plurality of N laser data channels which is different from a programmable address used by another group of m adjacent laser data channels of the plurality of N laser data channels to provide sub-microdot matrixing.

16. The method of claim 14 wherein in performing the substep (a4) performing the steps of:

(d) storing a predetermined number of binary pixel values transmitted in step (a2) and outputting the binary pixels values on a first-in-first-out basis; and (e) compensating for characteristic and alignment variations between the associated laser and remaining ones of the plurality of lasers in response to a binary pixel value outputted in step (d) for adjusting the binary pixel value to compensate for characteristic and alignment variations between the associated laser and remaining ones of the plurality of lasers.

17. The method of claim 16 wherein in performing step (a4). performing the further step of:

(f) delaying the transmission of the binary pixel value from step (e) to a laser associated with the laser data channel by a predetermined number of timing signals from the pixel clock transmitting at the predetermined frequency. the predetermined number of timing signals used by each of the plurality of N laser data channels being a predetermined difference when the plurality of N lasers are not aligned parallel to a longitudinal axis of the drum.

18. The method of claim 13 wherein in performing step (c). the variable lens magnifying means is a fixed conjugate focal point zoom lens for imaging a light pattern at a first conjugate plane in front of the zoom lens to a second conjugate plane in back of the zoom lens.

* * * * *